US010993368B2

(12) United States Patent
Kendall et al.

(10) Patent No.: US 10,993,368 B2
(45) Date of Patent: May 4, 2021

(54) SPREAD CONTROL MECHANISM

(71) Applicant: Earthway Products, Inc., Bristol, IN (US)

(72) Inventors: Jeffrey D. Kendall, Laurel, MD (US); Richard Sevrey, Bristol, IN (US)

(73) Assignee: EarthWay Products, Inc., Bristol, IN (US)

( * ) Notice: Subject to any disclaimer, the term of this patent is extended or adjusted under 35 U.S.C. 154(b) by 445 days.

(21) Appl. No.: 15/786,064

(22) Filed: Oct. 17, 2017

(65) Prior Publication Data

US 2018/0035604 A1 Feb. 8, 2018

Related U.S. Application Data

(63) Continuation of application No. 14/886,183, filed on Oct. 19, 2015, now Pat. No. 9,820,430, which is a continuation-in-part of application No. 14/875,056, filed on Oct. 5, 2015, now Pat. No. 10,225,976, which is a continuation of application No. 13/919,682, filed on Jun. 17, 2013, now Pat. No. 9,198,345, which is a continuation of application No. 13/661,620, filed on Oct. 26, 2012, now Pat. No. 9,192,094.

(60) Provisional application No. 62/066,621, filed on Oct. 21, 2014, provisional application No. 61/552,030, filed on Oct. 27, 2011.

(51) Int. Cl.
*A01C 17/00* (2006.01)
*A01C 15/02* (2006.01)

(52) U.S. Cl.
CPC ............ *A01C 17/008* (2013.01); *A01C 15/02* (2013.01)

(58) Field of Classification Search
CPC .............................. A01C 15/06; A01C 17/008
USPC .................................................. 239/650–689
See application file for complete search history.

(56) References Cited

U.S. PATENT DOCUMENTS

| | | | | |
|---|---|---|---|---|
| 332,506 A | * | 12/1885 | Eberhart ................ | A01C 17/00 239/665 |
| 2,687,307 A | * | 8/1954 | Austermiller ........ | A01C 17/006 239/687 |
| 3,899,138 A | * | 8/1975 | van der Lely ......... | A01C 17/00 239/661 |
| 4,106,704 A | * | 8/1978 | McRoskey ............. | A01C 15/02 222/625 |
| 4,135,560 A | * | 1/1979 | Eang ........................ | B65B 1/14 141/198 |
| 4,136,804 A | * | 1/1979 | Kinzler .................. | B65D 88/64 222/506 |
| 4,381,080 A | * | 4/1983 | van der Lely ......... | A01C 17/00 239/666 |
| 4,469,210 A | * | 9/1984 | Blumer .................. | B65G 47/44 193/22 |
| 4,479,608 A | * | 10/1984 | Martin ................... | A01C 3/063 239/662 |

(Continued)

*Primary Examiner* — Viet Le

(57) ABSTRACT

A spread control assembly is provided that includes a spread control mechanism and a shut-off adjustment plate attached to a particulate dispersing apparatus. The shut-off adjustment plate includes multiple exit openings that facilitate the dispersing of particulate material. The spread control mechanism pivotally attaches to the shut-off adjustment plate and includes multiple paddles configured to cover at least one of the exit openings in the shut-off adjustment plate when the spread control mechanism is in an activated position.

27 Claims, 20 Drawing Sheets

(56) References Cited

U.S. PATENT DOCUMENTS

| | | | | |
|---|---|---|---|---|
| 4,511,090 A * | 4/1985 | Morgan | A01C 15/02 | 239/666 |
| 4,548,362 A * | 10/1985 | Doering | A01C 17/00 | 222/545 |
| 4,597,531 A * | 7/1986 | Kise | A01C 17/006 | 239/650 |
| 5,203,510 A * | 4/1993 | Courtney | A01C 17/006 | 239/667 |
| 5,287,999 A * | 2/1994 | Olsen | A01C 15/16 | 222/410 |
| 5,842,648 A * | 12/1998 | Havlovitz | A01C 7/02 | 239/650 |
| 6,047,909 A * | 4/2000 | Simpson | A01C 15/006 | 239/600 |
| 6,138,927 A * | 10/2000 | Spear | A01C 15/02 | 239/666 |
| 6,354,320 B1 * | 3/2002 | Kolacz | A62C 31/24 | 137/38 |
| 6,499,679 B1 * | 12/2002 | Woodruff | A01C 15/02 | 239/650 |
| 6,588,685 B2 * | 7/2003 | Woodruff | A01C 15/02 | 239/650 |
| 6,616,074 B2 * | 9/2003 | Courtney | A01C 15/008 | 239/666 |
| 6,907,832 B2 * | 6/2005 | Wyne | A01C 17/001 | 111/130 |
| 6,921,037 B2 * | 7/2005 | Wysong | B65G 69/0491 | 239/665 |
| 6,945,481 B2 * | 9/2005 | Thompson | A01C 7/08 | 239/650 |
| 7,063,280 B1 * | 6/2006 | Bogart | A01C 17/008 | 239/505 |
| 7,380,735 B2 * | 6/2008 | Hayward | B29B 17/02 | 241/19 |
| 8,056,838 B2 * | 11/2011 | Conner | A01C 17/006 | 222/625 |
| 8,066,206 B1 * | 11/2011 | Cotham | A01C 7/02 | 239/653 |
| D729,849 S * | 5/2015 | Kendall | D15/13 | |
| D729,850 S * | 5/2015 | Kendall | D15/13 | |
| D730,410 S * | 5/2015 | Kendall | D15/13 | |
| 9,192,094 B2 * | 11/2015 | Kendall | B05B 7/1404 | |
| 2002/0014545 A1 * | 2/2002 | Woodruff | A01C 15/02 | 239/650 |
| 2003/0192968 A1 * | 10/2003 | Courtney | A01C 15/008 | 239/687 |
| 2006/0157518 A1 * | 7/2006 | Havlovitz | A01C 15/02 | 222/617 |
| 2011/0309170 A1 * | 12/2011 | Weeks | A01C 15/006 | 239/661 |
| 2012/0018546 A1 * | 1/2012 | Conner | A01C 17/006 | 239/666 |
| 2013/0105592 A1 * | 5/2013 | Kendall | B05B 7/1404 | 239/7 |

\* cited by examiner

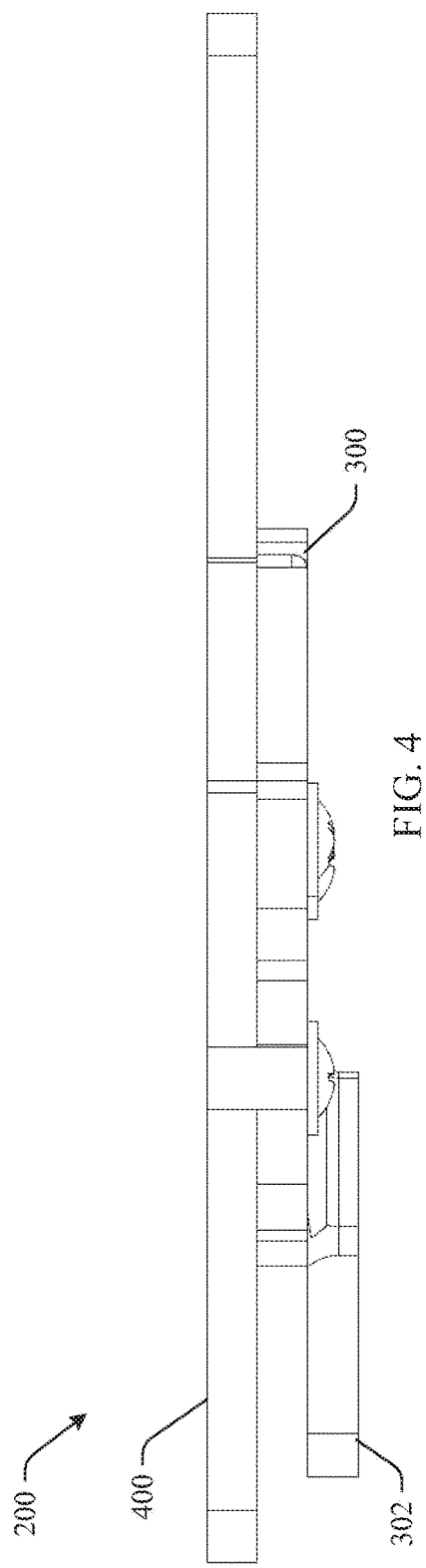
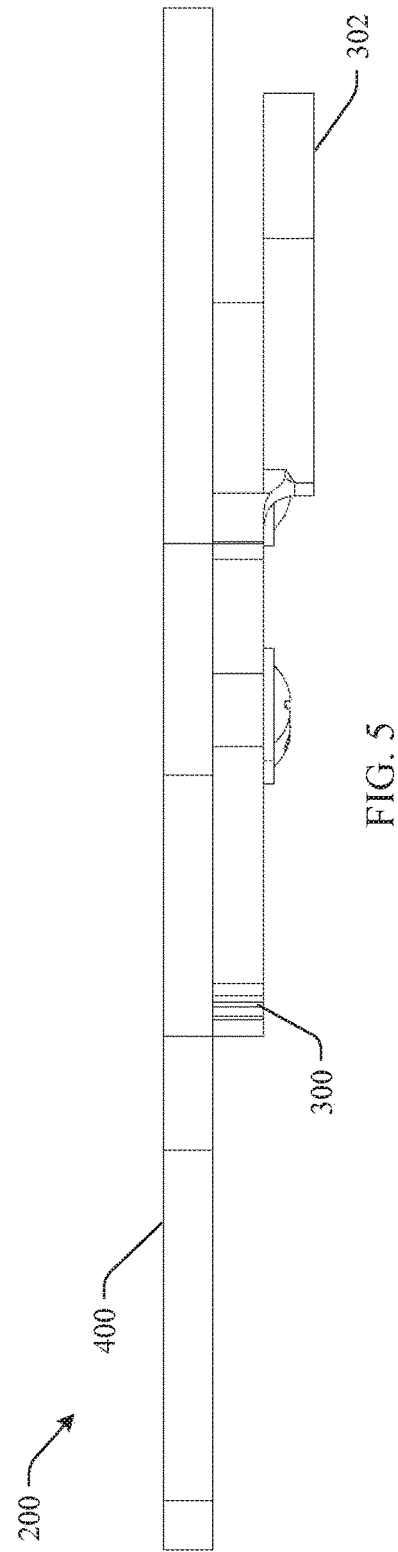

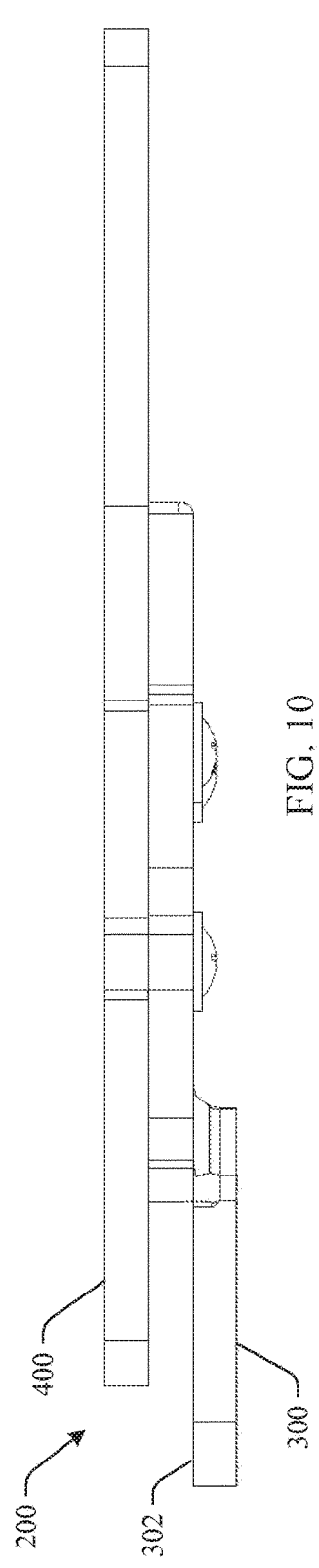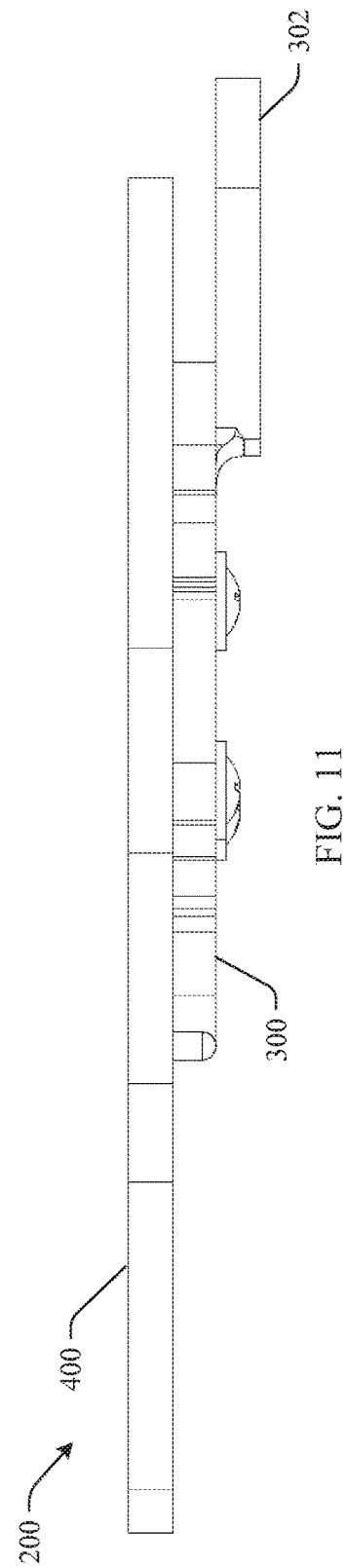

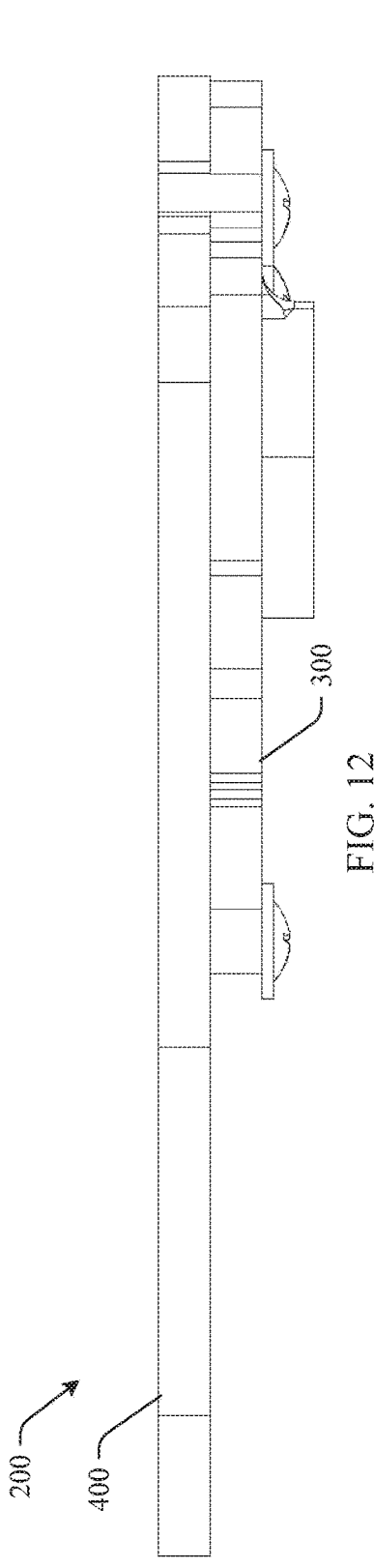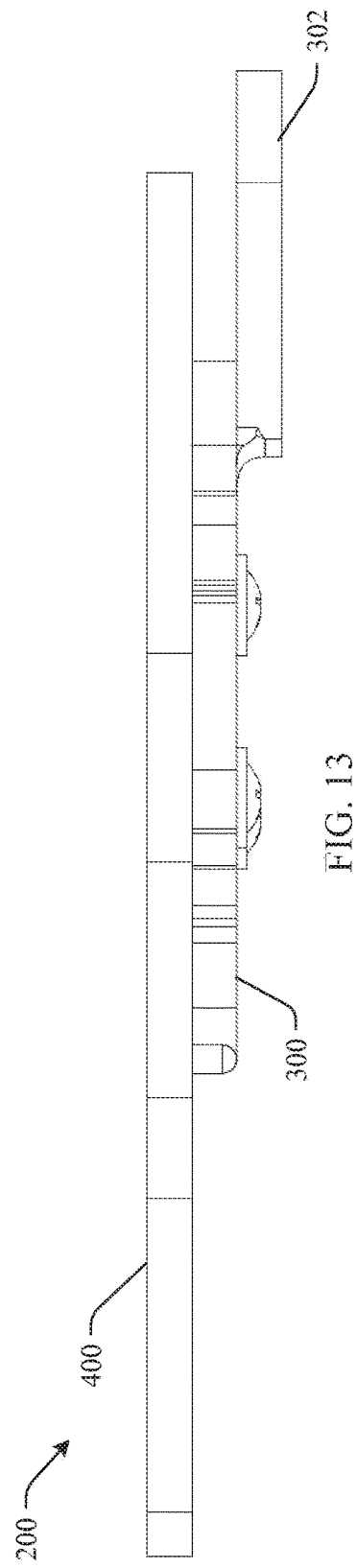

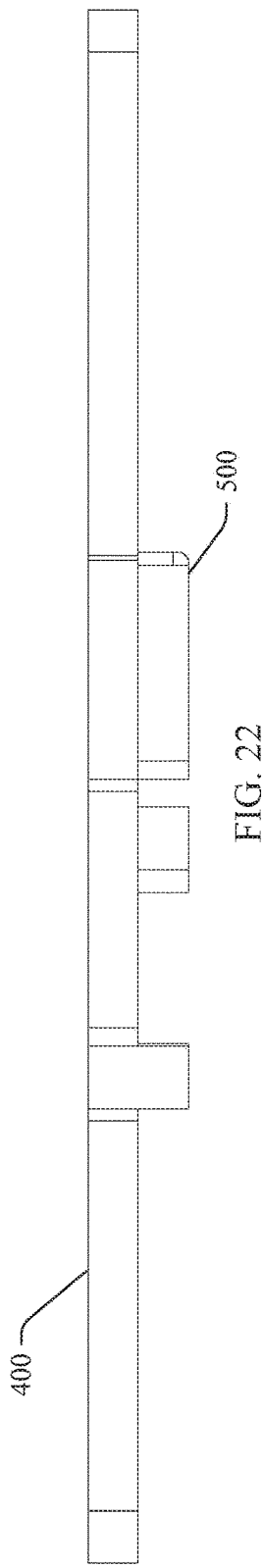
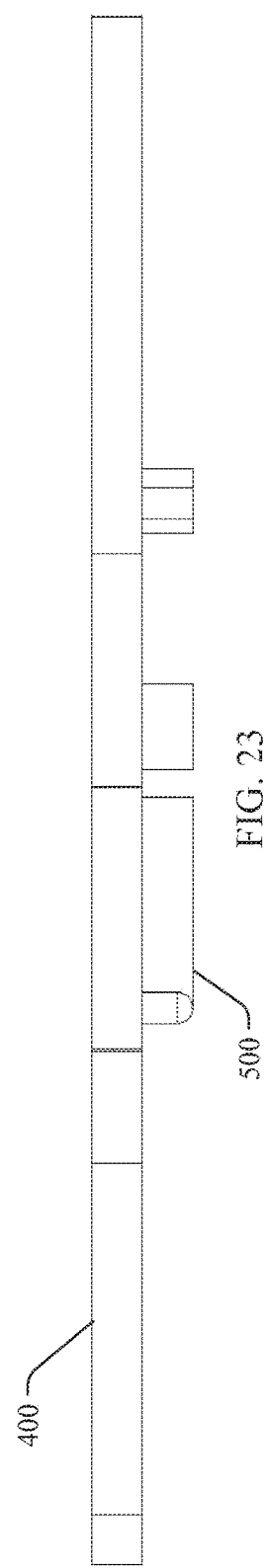

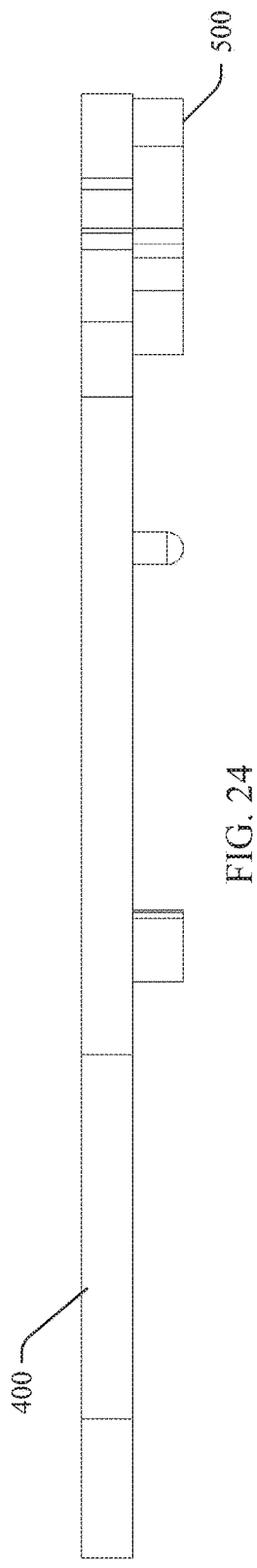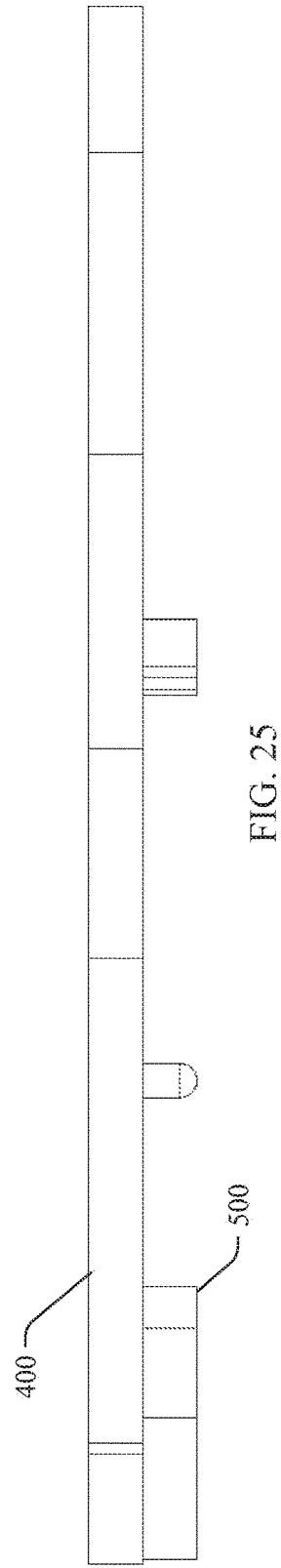

SPREAD CONTROL MECHANISM

This application is a continuation of allowed U.S. patent application Ser. No. 14/886,183, entitled "SPREAD CONTROL MECHANISM", filed on Oct. 19, 2015, which claims the benefit of U.S. Provisional Patent Application Ser. No. 62/066,621, entitled "SPREAD CONTROL MECHANISM" filed on Oct. 21, 2014. The entirety of the above-noted applications are incorporated by reference herein.

ORIGIN

The innovation disclosed herein relates to a particulate dispersing apparatus and, more specifically, to a granular spreader having a spread control mechanism.

BACKGROUND

A known particulate spreader incorporates a deflector that when activated impedes particulate material from exiting out one side of the spreader. Thus, any, material dispersed in the spread pattern is impeded from spreading onto non-lawn areas, such as landscape beds, driveways, walkways, etc. In other words, the deflector simply deflects the dispensed material back toward the lawn area. A disadvantage of material dispersing systems that rely on such a deflector is that the amount of material dispersed (material flow rate) into the spread pattern remains the same whether or not a deflector is activated. Thus, if the deflector is activated the amount of material directed onto the lawn is more than the recommended amount since the deflected material also exits the side of the spreader opposite that of the deflector. This leads to over treatment of the lawn and to wasted product.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

In an aspect of the innovation a spread control assembly is provided and includes a shut-off adjustment plate attached to a particulate dispersing apparatus, the shut-off adjustment plate including a plurality of exit openings to facilitate the dispersing of particulate material, and a spread control mechanism pivotally attached to the shut-off adjustment plate, the spread control mechanism including a plurality of paddles configured to cover at least one of the plurality of exit openings in the shut-off adjustment plate when the spread control mechanism is in an activated position.

In another aspect of the innovation a particulate material dispersing apparatus is disclosed that includes a hopper attached to a frame, a spread control assembly attached to a bottom of the hopper that when in an activated position alters a material spread pattern of the particulate material, and a dispersing mechanism disposed below the spread control assembly.

In still yet another aspect of the innovation, a method of dispersing particulate material is disclosed that includes providing a particulate material dispensing apparatus having a spread control assembly, moving a spread control mechanism of the spread control assembly to an activated position, dispersing particulate material in a direction to a side opposite the covered exit openings, impeding, simultaneously, dispersing particulate material in a direction that corresponds to the side of the covered exit openings, reducing, simultaneously, an amount of dispersed particulate material, moving the spread control mechanism to a deactivated position, and dispersing the particulate material in all directions.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIG. 4 is a front view of the innovative spread control assembly in a deactivated position in accordance with an aspect of the innovation.

FIG. 5 is a rear view of the innovative spread control assembly in a deactivated position in accordance with an aspect of the innovation.

FIG. 10 is a front view of the innovative spread control assembly in an activated position in accordance with an aspect of the innovation.

FIG. 11 is a rear view of the innovative spread control assembly in an activated position in accordance with an aspect of the innovation.

FIG. 12 is a left side view of the innovative spread control assembly in an activated position in accordance with an aspect of the innovation.

FIG. 13 is a right side view of the innovative spread control assembly in an activated position in accordance with an aspect of the innovation.

FIG. 22 is a front view of the innovative shut-off adjustment plate in accordance with an aspect of the innovation.

FIG. 23 is a rear view of the innovative shut-off adjustment plate in accordance with an aspect of the innovation.

FIG. 24 is a left side view of the innovative shut-off adjustment plate in accordance with an aspect of the innovation.

FIG. 25 is a right side view of the innovative shut-off adjustment plate in accordance with an aspect of the innovation.

DETAILED DESCRIPTION

Figure 1A:
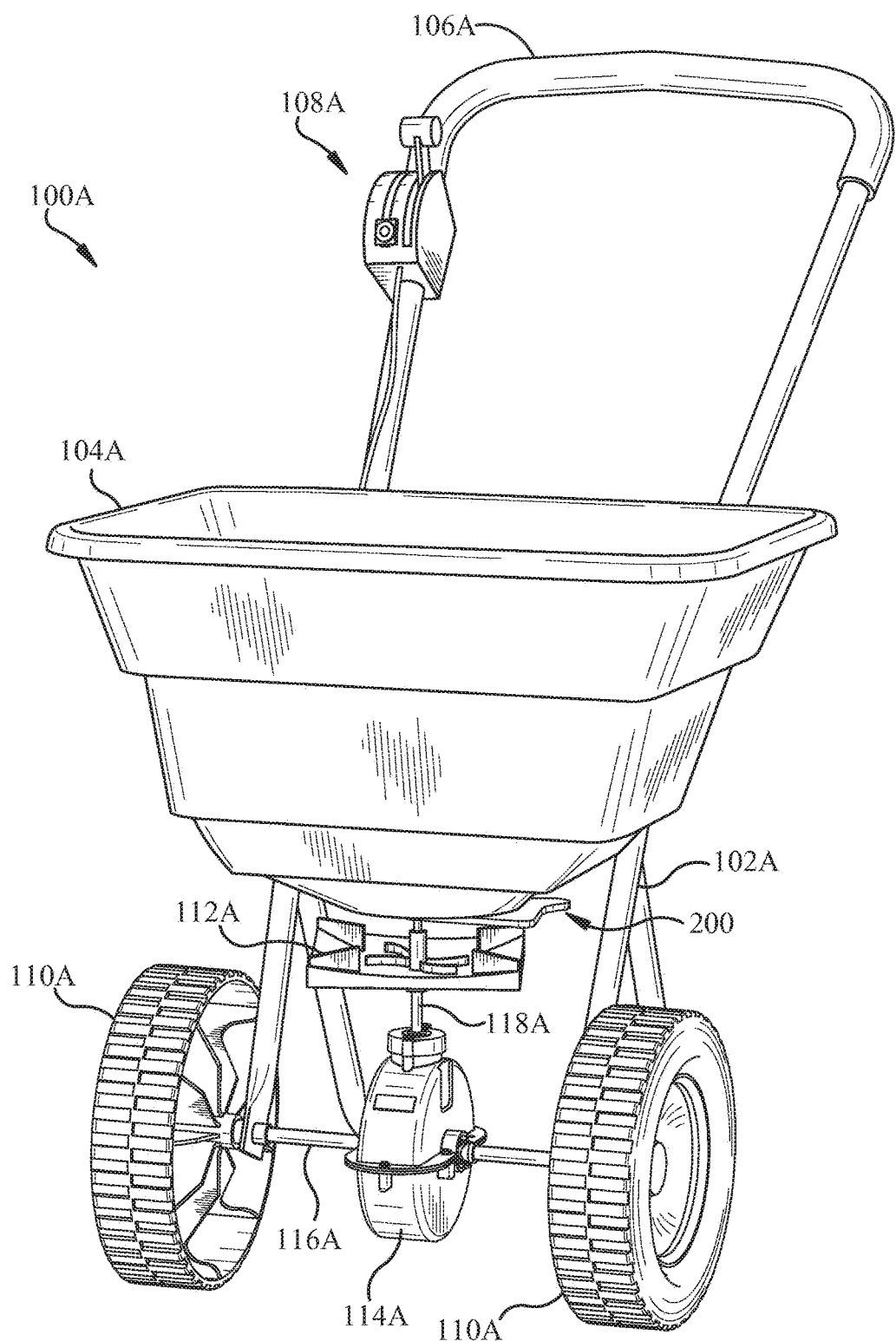
FIG. 1A is a perspective view of an example particulate dispensing apparatus featuring the innovation disclosed herein in accordance with the innovation.
Figure 1B:
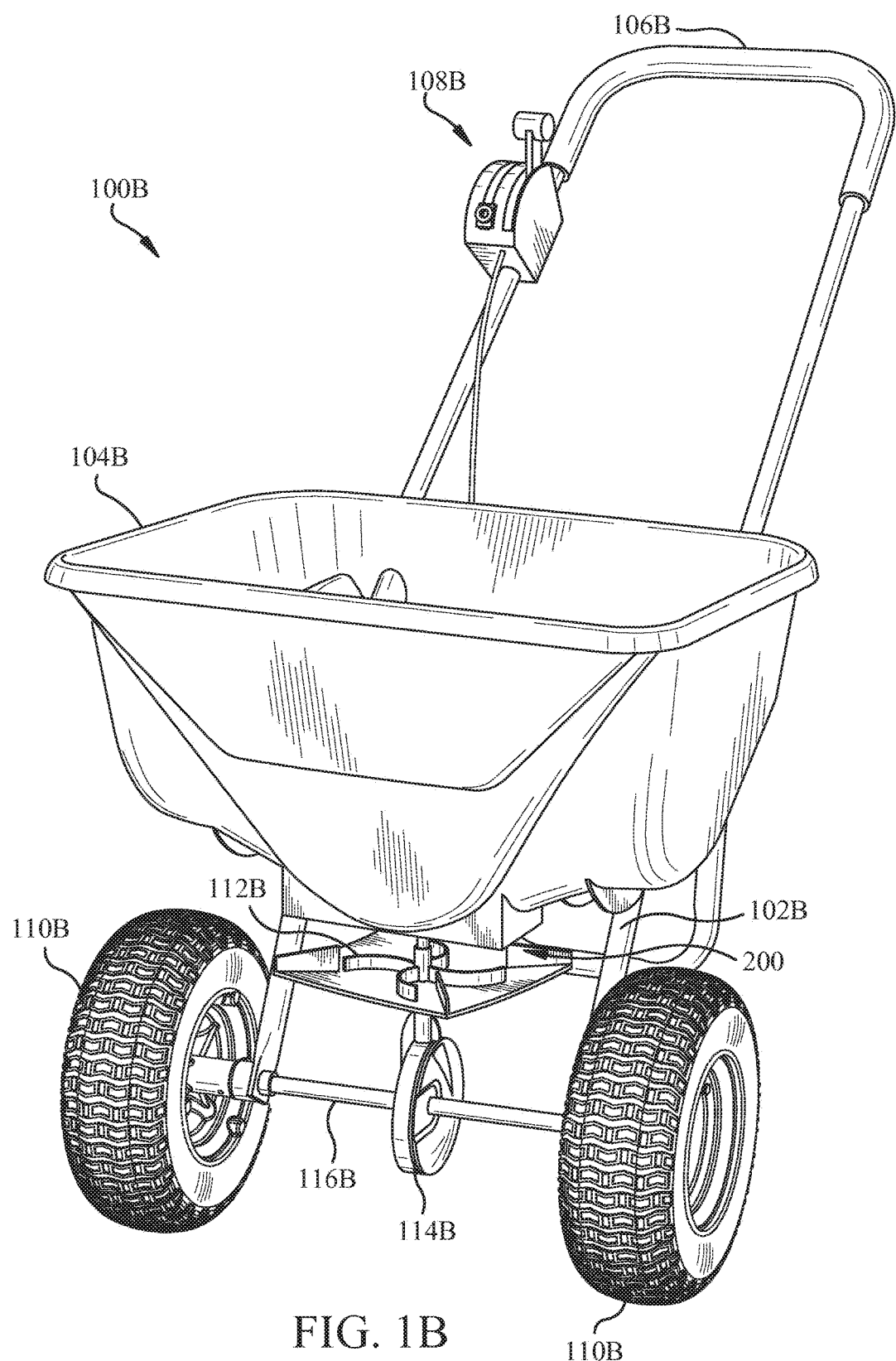
FIG. 1B is a perspective view of another example particulate dispensing apparatus featuring the innovation disclosed herein in accordance with the innovation.
Figure 2:
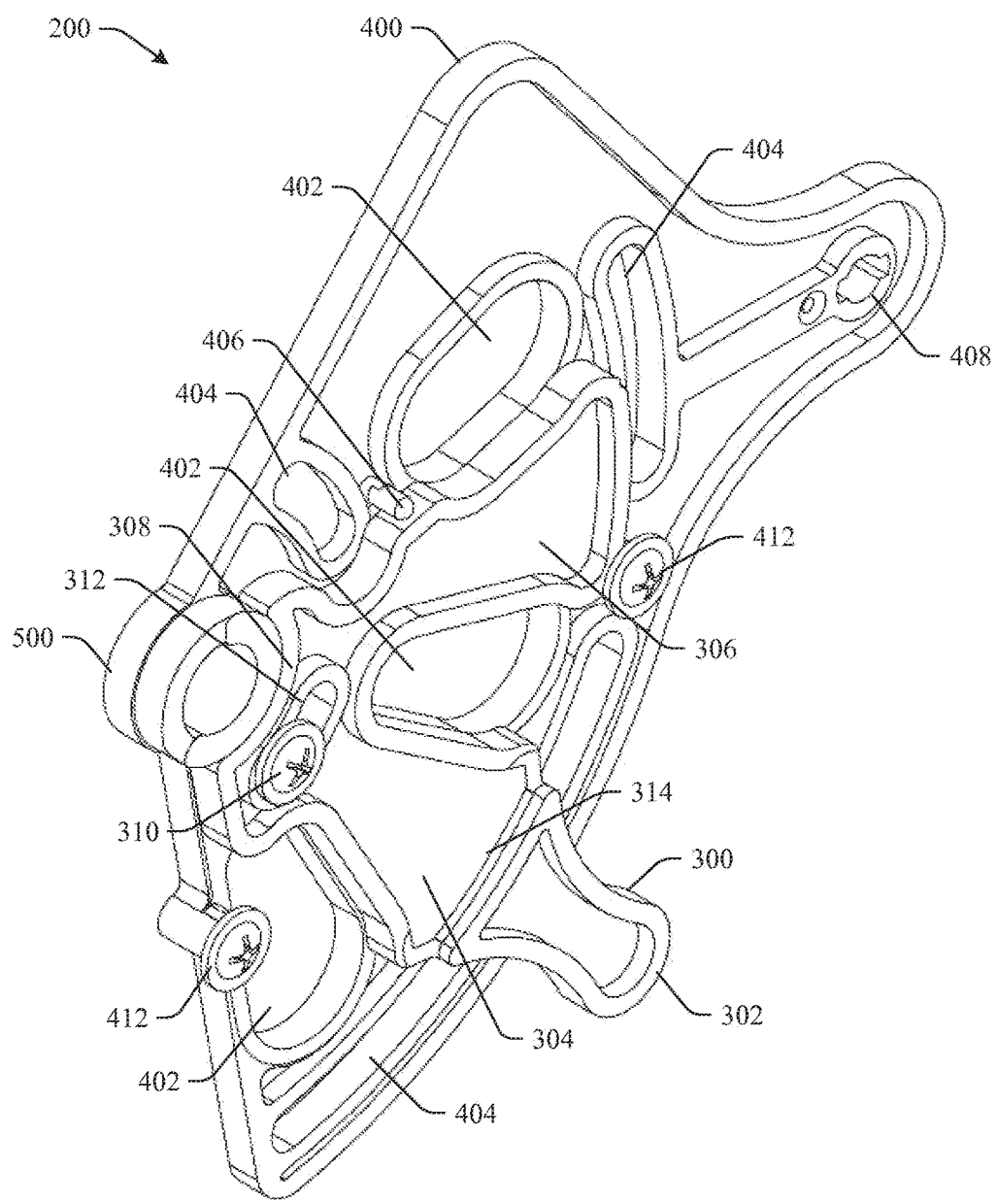
FIG. 2 is a bottom perspective view of an innovative spread control assembly in a deactivated position in accordance with an aspect of the innovation.
Figure 3:
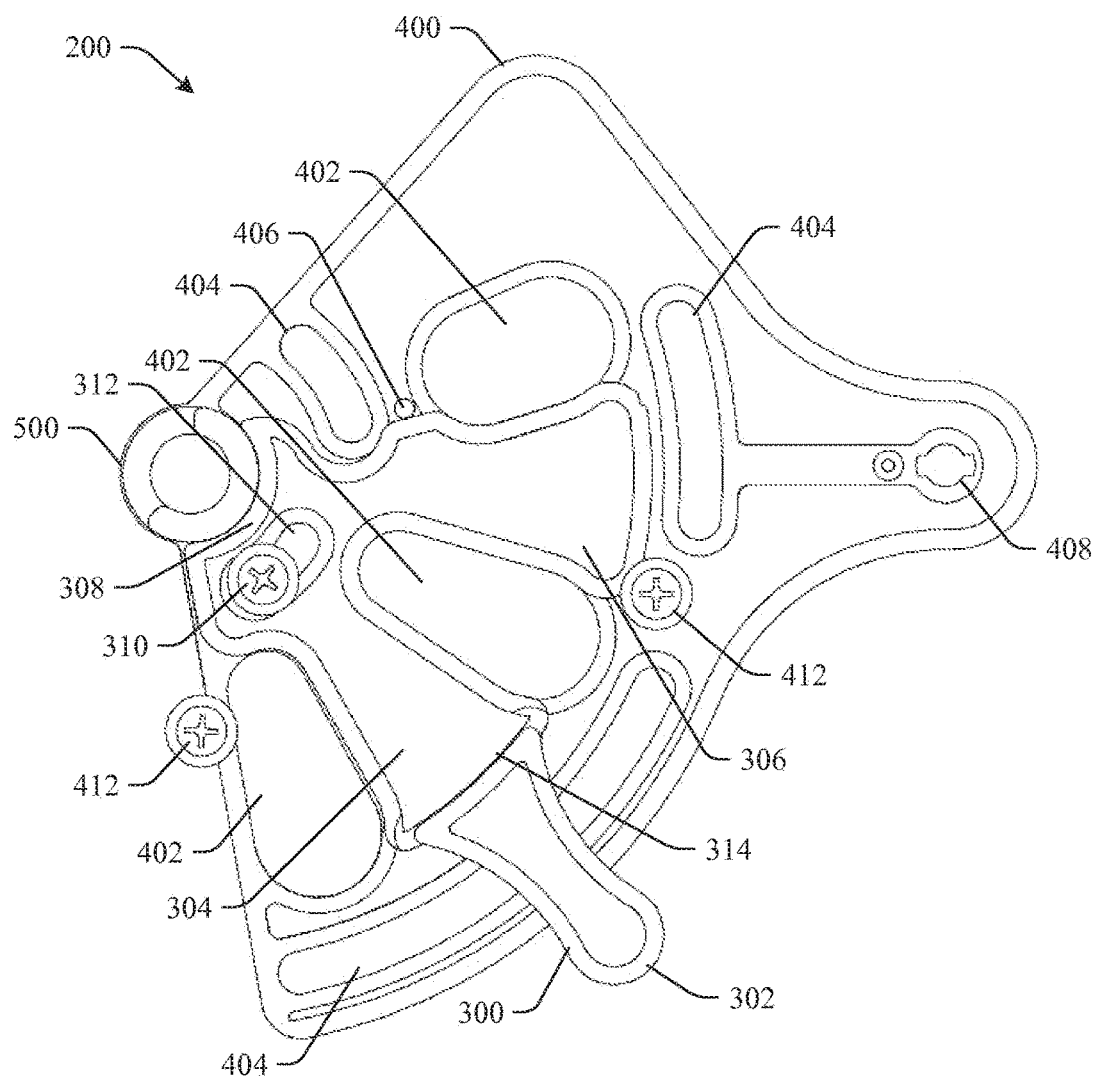
FIG. 3 is a bottom view of the innovative spread control assembly in a deactivated position in accordance with an aspect of the innovation.
Figure 6:
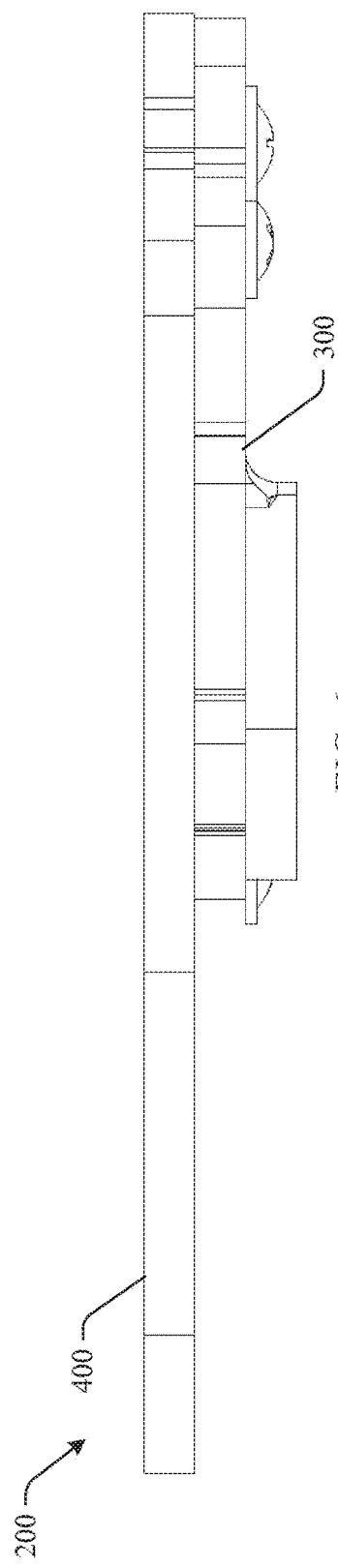
FIG. 6 is a left side view of the innovative spread control assembly in a deactivated position in accordance with an aspect of the innovation.
Figure 7:
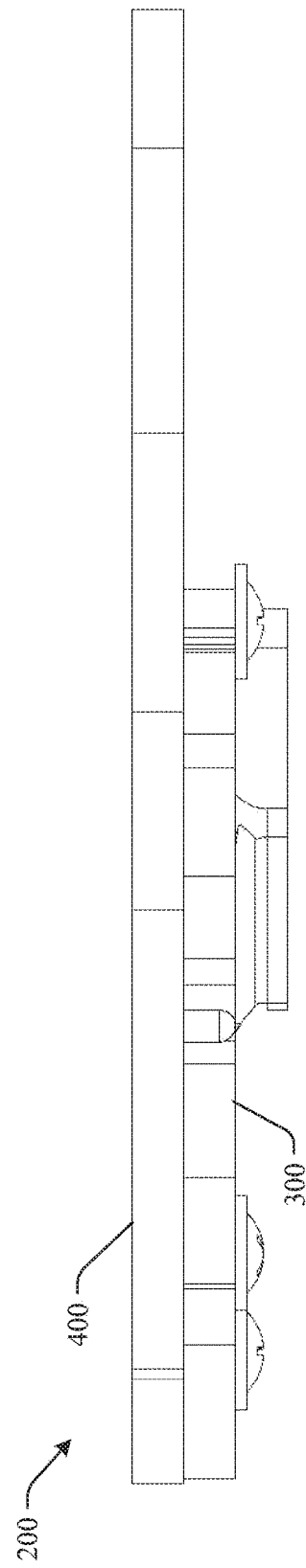
FIG. 7 is a right side view of the innovative spread control assembly in a deactivated position in accordance with an aspect of the innovation.
Figure 8:
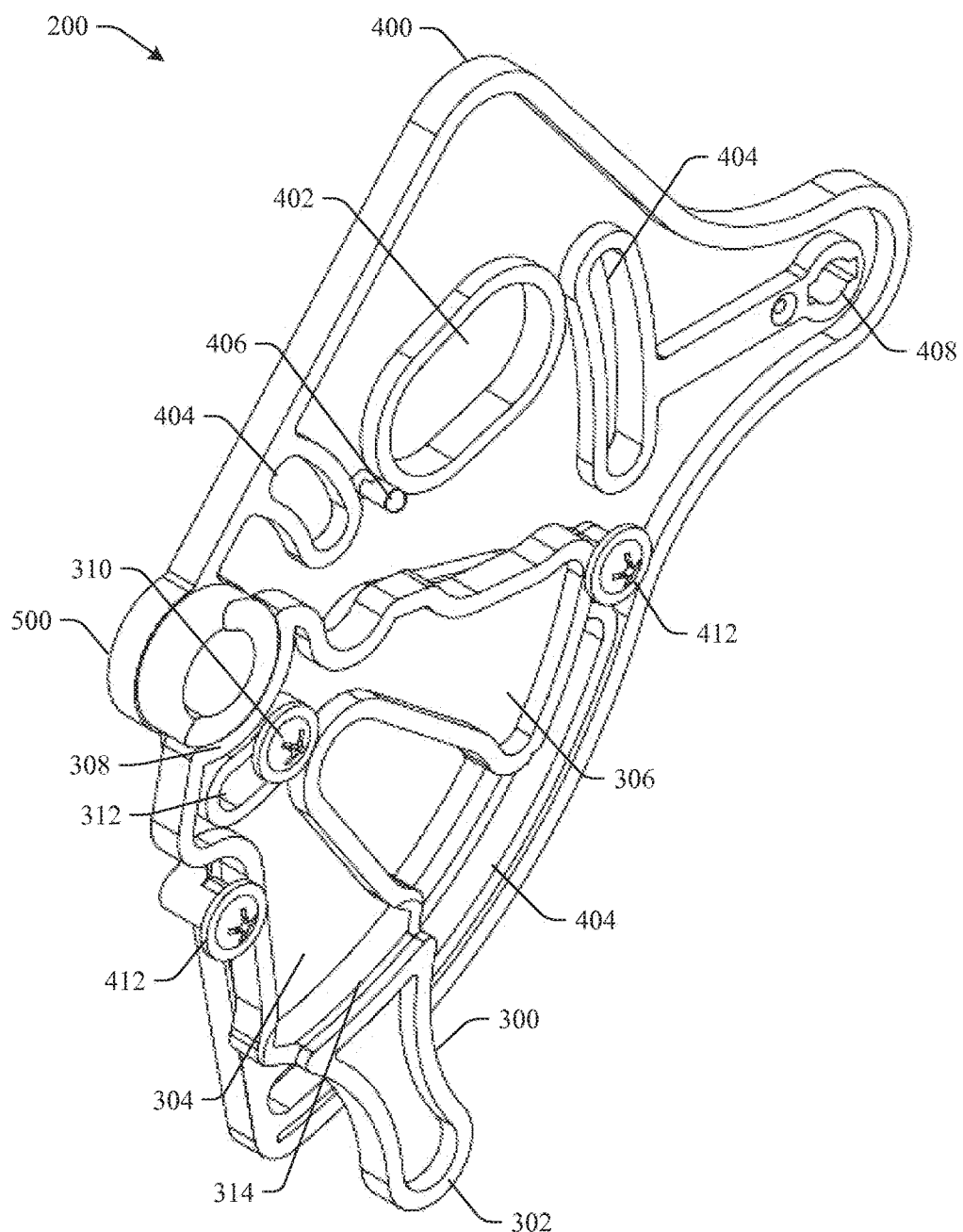
FIG. 8 is a bottom perspective view of the innovative spread control assembly in an activated position in accordance with an aspect of the innovation.
Figure 9:
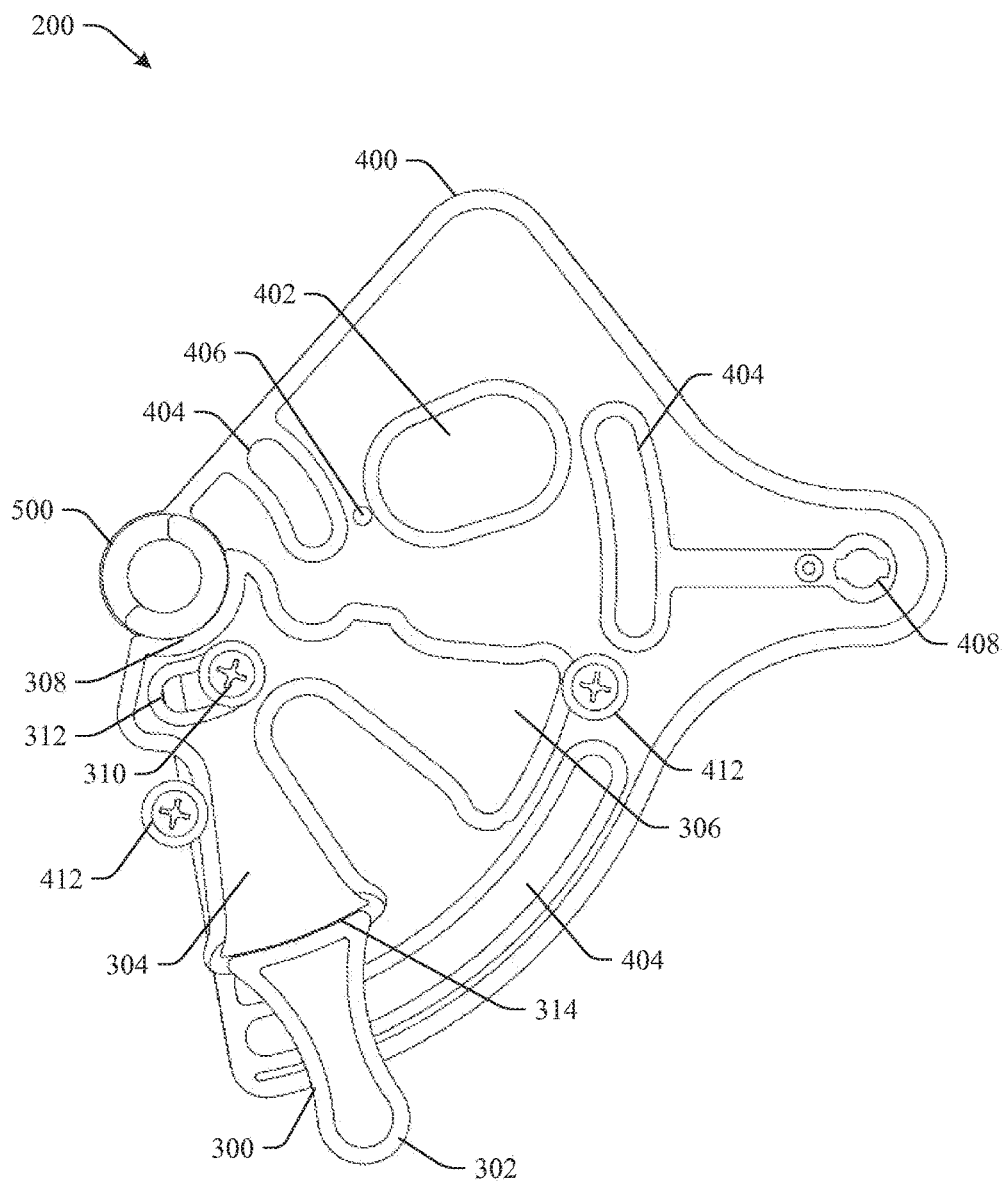
FIG. 9 is a bottom view of the innovative spread control assembly in an activated position in accordance with an aspect of the innovation.
Figure 14:
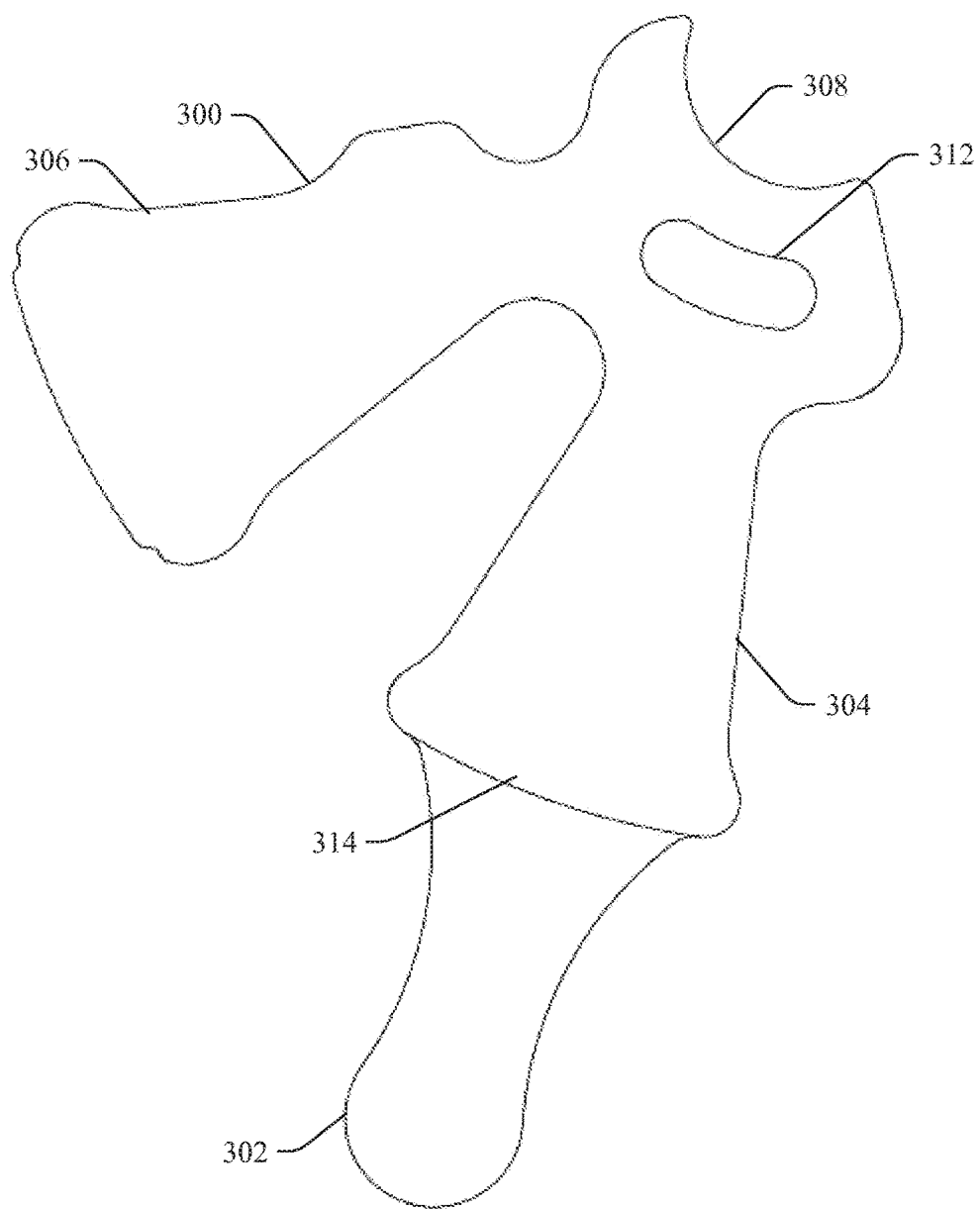
FIG. 14 is a top view of an innovative spread control mechanism in accordance with an aspect of the innovation.
Figure 15:
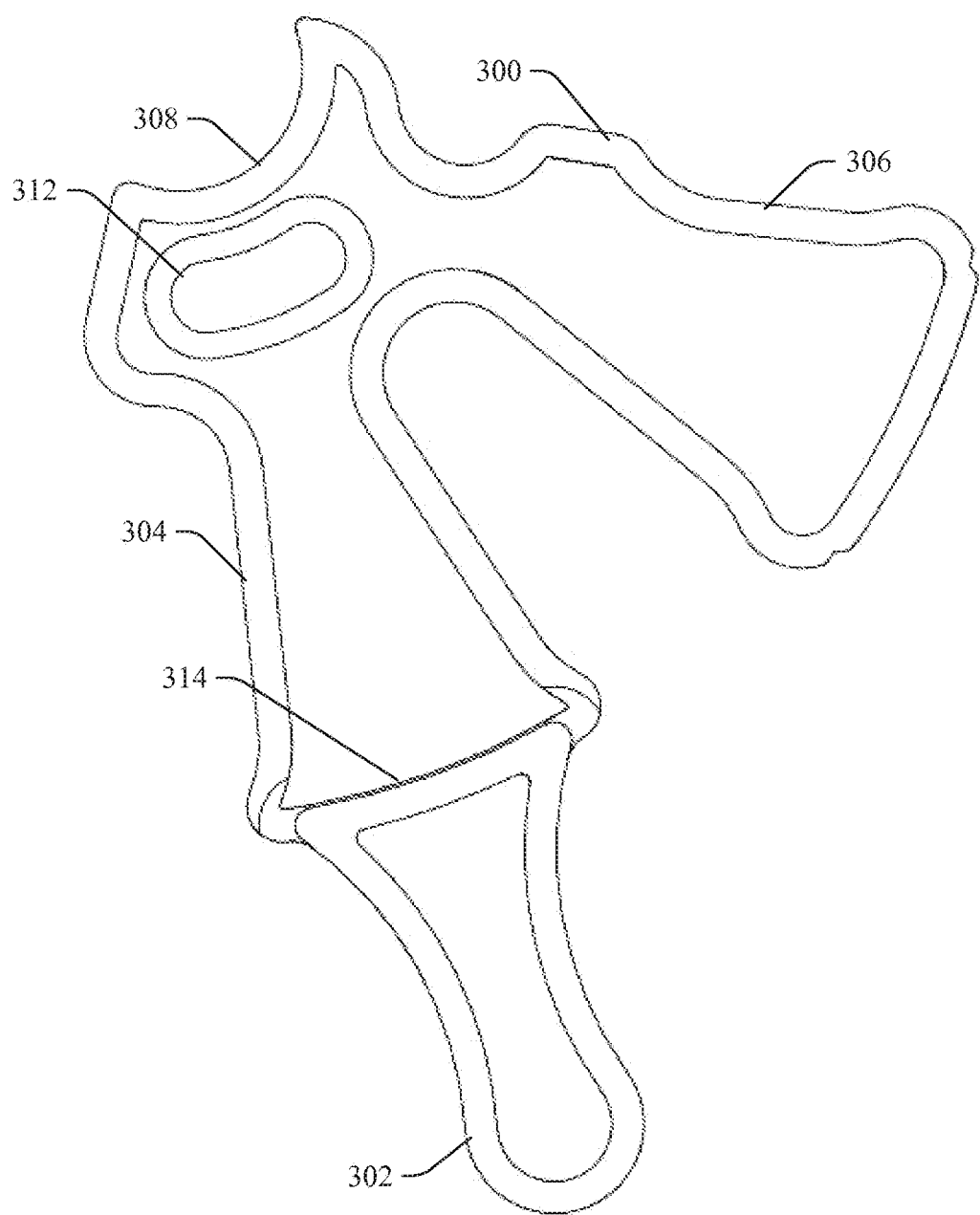
FIG. 15 is a bottom view of the innovative spread control mechanism in accordance with an aspect of the innovation.
Figure 16:
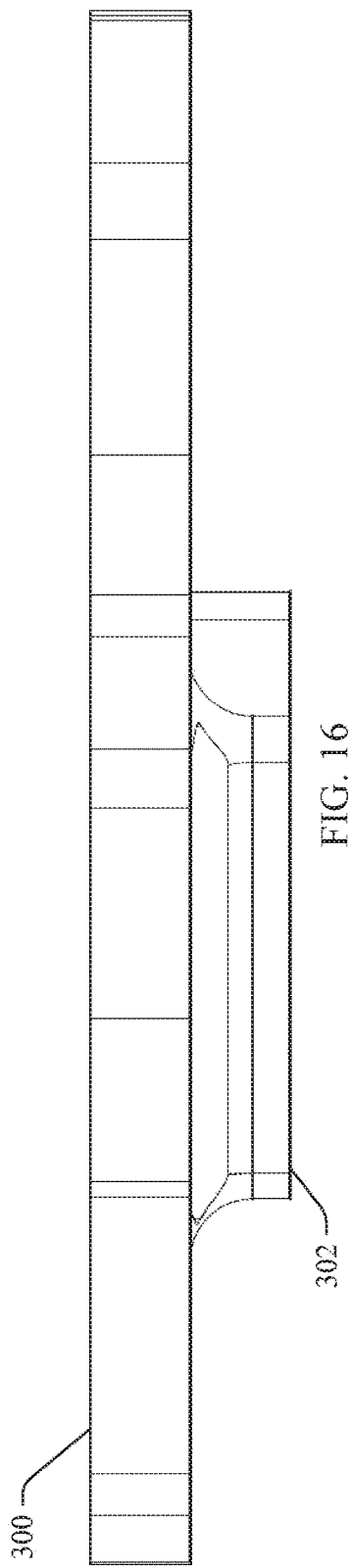
FIG. 16 is a front view of the innovative spread control mechanism accordance with an aspect of the innovation.
Figure 17:
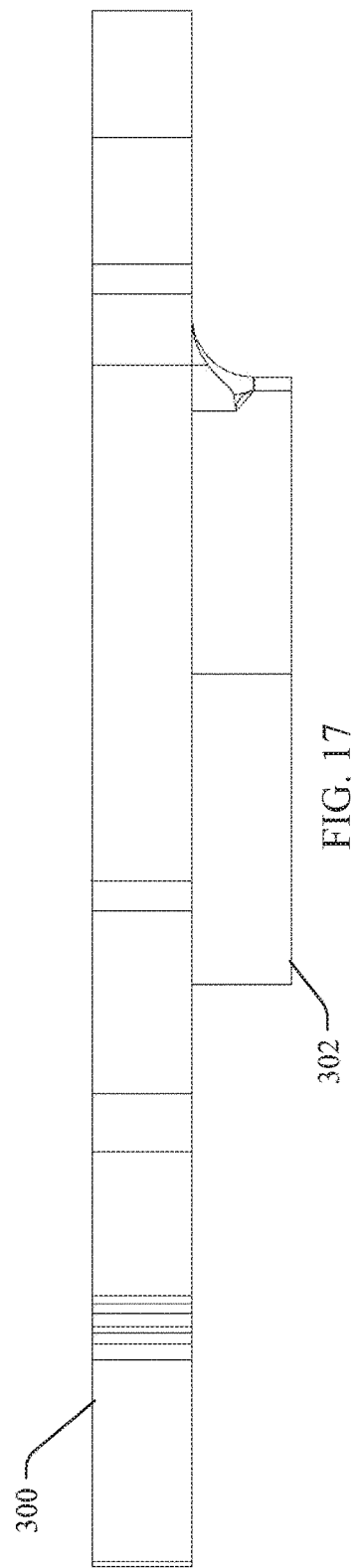
FIG. 17 is a rear view of the innovative spread control mechanism in accordance with an aspect of the innovation.
Figure 18:
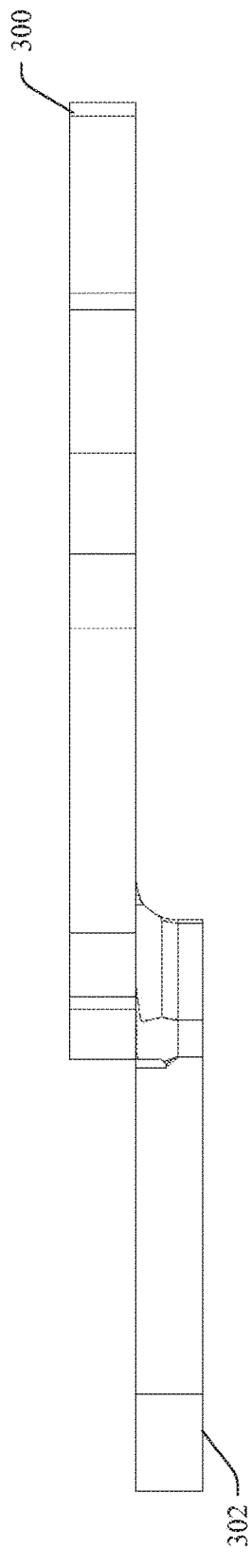
FIG. 18 is a left side view of the innovative spread control mechanism in accordance with an aspect of the innovation.
Figure 19:
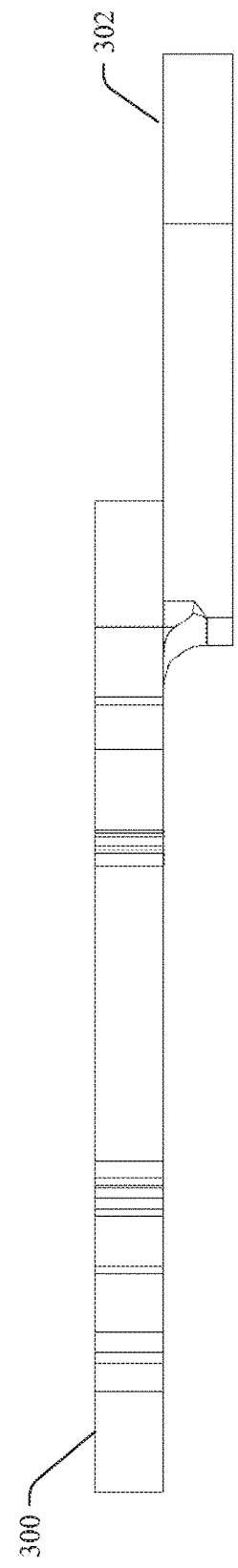
FIG. 19 is a right side view of the innovative spread control mechanism in accordance with an aspect of the innovation.
Figure 20:
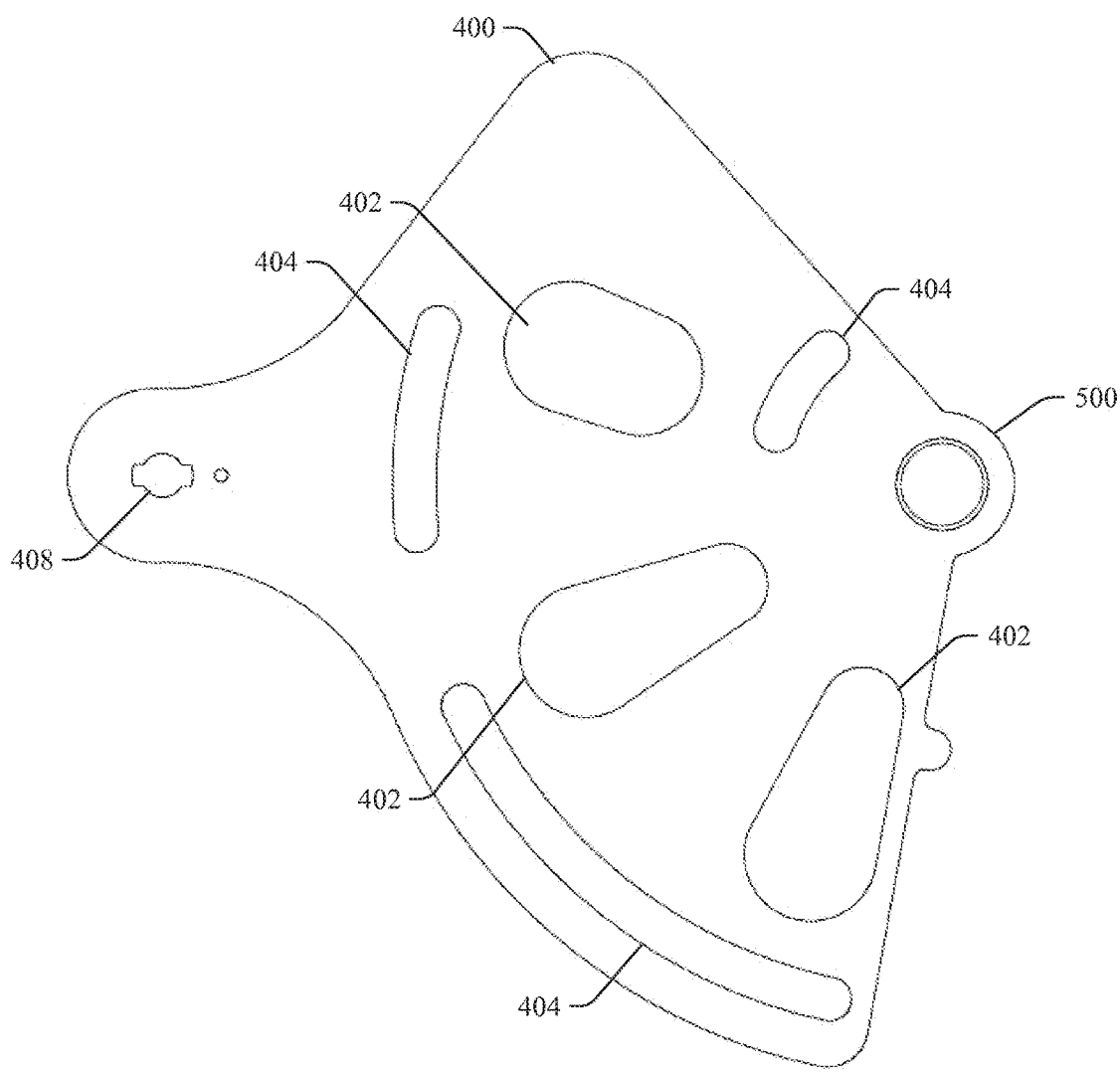
FIG. 20 is a top view of an innovative shut-off adjustment plate in accordance with an aspect of the innovation.
Figure 21:
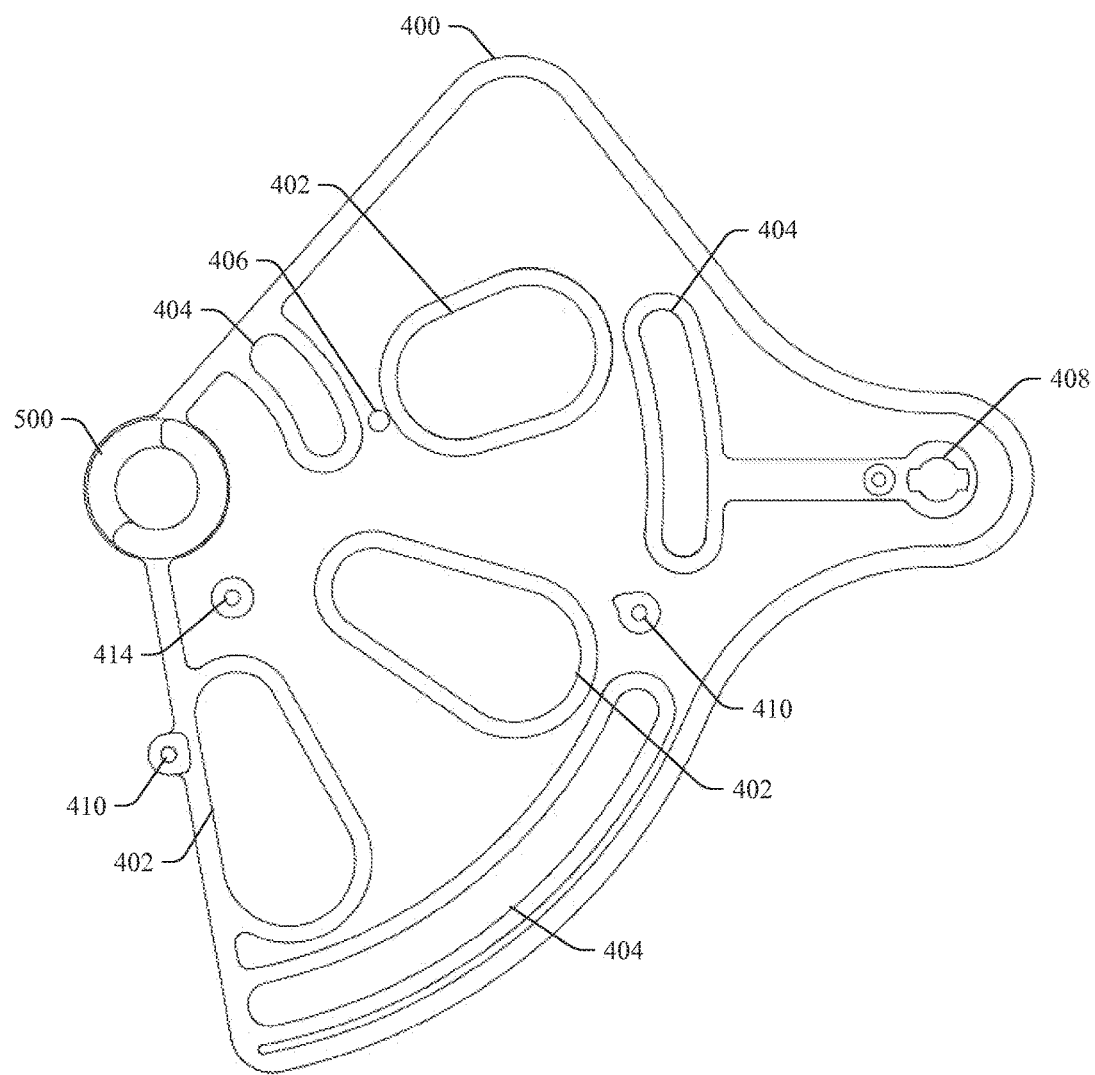
FIG. 21 is a bottom view of the innovative shot-off adjustment plate in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

While specific characteristics are described herein (e.g., thickness), it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Disclosed herein is an innovative spread control assembly for use on a particulate dispersing apparatus that when activated impedes particulate material from being dispersed out one side of the particulate apparatus in accordance with an aspect of the innovation. When activated, the assembly overcomes the aforementioned disadvantage by simultaneously regulating a material flow rate of the particulate material, which impedes over treatment of the lawn and wasted material. Thus, the spread control assembly facilitates the reduction of particulate material that is dispersed onto non-lawn areas (e.g., landscape beds, driveways, etc.) while simultaneously regulating the material flow rate.

With reference now to the figures, FIGS. 1A and 1B illustrate example embodiments of a particulate material dispersing apparatus 100A, 100B that incorporates the innovative spread control assembly 200 (shown in FIG. 1A) in accordance with aspects of the innovation. It is to be understood that the particulate material dispersing apparatus 100A, 100B may be any type of particulate dispersing apparatus capable of dispersing particulate and/or granular material (hereinafter "material"), such as but not limited to lawn seed/fertilizer, salt, etc. In addition, the particulate material dispersing apparatus 100A, 100B may be a walk behind type spreader, a hand-held type spreader, a tow-type spreader, etc. The example particulate material dispersing apparatus 100A, 100B illustrated in FIGS. 1A and 1B are walk behind type spreaders and will be used to describe the innovation disclosed herein. Thus, the example particulate material dispersing apparatus 100A, 100B illustrated in FIGS. 1A and 1B are for illustration purposes only and are not intended to limit the scope of the innovation.

Still referring to FIGS. 1A and 1B, the example particulate material dispersing apparatus 100A, 100B, includes a frame 102A, 100B, a vessel or hopper 104A, 104B, mounted to the frame 102A, 102B, a push handle 106A, 106B mounted to the frame 102A, 102B, an open-close/adjustment (shut-off) assembly 108A, 108B, a pair of wheels 110A, 110B, a dispersing mechanism 112A, 112B disposed below the innovative spread control assembly and configured to disperse product from inside the hopper 104A, 104B, and a gear box 114A, 114E operatively connecting the wheels 110A, 110B, and the dispersing mechanism 112A, 112B via an axle 116A, 116B, and a gear/impeller shaft 118A (best shown in FIG. 1A).

In the example embodiment illustrated in the figures, the hopper 104A, 104B has a rectangular type shape, as viewed from the top, but it is to be understood that the shape of the hopper 104A, 104B can be any shape, such as but not limited to square, circular, etc. An opening (not shown) is defined in a bottom of the hopper 104A, 104B that facilitates the dispersing of the particulate material in association with the innovative spread control assembly 200.

FIGS. 2-7 illustrate the innovative spread control assembly 200 in a non-activated (open) state in accordance with an aspect of the innovation. In the non-activated state, the spread control assembly 200 allows the dispersion of material in all directions, as will be explained further below. FIGS. 8-13 illustrate the spread control assembly 200 in an activated (closed) state in accordance with an aspect of the innovation. In the activated state, the spread control assembly 200 impedes the dispersion of material in one side direction and allows the dispersion of material in an opposite side direction while simultaneously reducing the material flow rate.

Thus, the spread control assembly 200 is configured to alter a material spread pattern of the particulate material dispersing apparatus 100A, 100B. More specifically, the spread control assembly 200, when activated, impedes material from being dispersed through one or more exit openings defined in a shut-off adjustment plate explained further below. Therefore, a reduced amount of material is dispersed through only those remaining exit openings not covered by a spread control mechanism thereby eliminating product overuse and waste.

In addition, activation of the spread control assembly 200 causes the material to be dispersed outward from one side of the particulate material dispersing apparatus 100A, 100B while impeding material from being dispersed out an opposite side of the particulate material dispersing apparatus 100A, 100B. Thus, any material dispersed in the altered-spread pattern is impeded from spreading onto non-lawn areas, such as landscape beds, driveways, walkways, etc. It is to be understood that the spread control assembly 200 can be configured to impede material dispersion from either side of the dispersing apparatus 100B, 100B. Thus in one example embodiment, the material may be dispersed from a first side (e.g., left or right) and impeded from being dispersed from a second side (e.g., right of left). Therefore, the example embodiment described herein and illustrated in the figures is for illustrative purposes only and is not intended to limit the scope of the innovation.

As illustrated in FIGS. 2-13, the innovative spread control assembly 200 includes a spread control mechanism 300, a shut-off adjustment plate 400, and a pivot mechanism 500 that pivotally connects the spread control mechanism 300 and the shut-off adjustment plate 400.

Referring to FIGS. 14-19, in the example embodiment illustrated in the figures, the spread control mechanism 300 includes a handle 302, multiple paddles including a first paddle 304, a second paddle 306, and a curved pivot engagement portion 308. The curved pivot engagement portion 308 facilitates the pivoting motion of the spread control mechanism 300 about the pivot mechanism 500. The spread control mechanism 300 attaches to the shut-off adjustment plate 400 via a fastener 310 that extends through a slot 312 defined in the spread control mechanism 300. The handle 302 connects to an end 314 of the first paddle 304 that is distal from the pivot mechanism 500. The handle 302 facilitates movement of the spread control mechanism 300 between and an activated (closed) and deactivated (open) state. The spread control mechanism 300 has a V-shaped configuration whereby the first and second paddles 304, 306 are spaced to facilitate application of material.

Referring to FIGS. 20-25, the shut-off adjustment plate 400 includes the multiple exit openings 402 defined therein and multiple elongated curved openings 404 that serve as hopper attachments openings whereby the shut-off adjustment plate 400 attaches to an outside bottom of the hopper 104A, 104B. The shut-off adjustment plate 400 further includes a vertically projecting stop mechanism 406, a control rod attachment opening 408, multiple hold down openings 410 (FIG. 21) that receive fasteners 412 that serve to hold down the spread control mechanism 300, and a spread control mechanism guide opening 414 (FIG. 21) that receives the fastener 310 mentioned above.

There are three exit openings 402 defined in the shut-off adjustment plate 400 in the example embodiment illustrated in the figures. It is to be understood, however, that there can be any number of exit openings 402 defined in the exit plate 400. In one example embodiment, the number of exit openings 402 is at least one greater than a number of paddles 304, 306. Thus, when the spread control mechanism 300 is activated all but one exit opening 402 will be covered thereby impeding any material from exiting the covered exit openings 402. Therefore, a reduced amount of material will exit the remaining exit openings 402, which directs the material to exit one side of the particulate material dispersing apparatus 100A, 100B.

When the spread control mechanism 300 is in a non-activated position, as shown in FIGS. 2-7, the spread control mechanism 300 is positioned such that all of the exit openings 402 are uncovered. The spread control mechanism 300 is slidably attached through the curved slot 312 via a washer head screw or other suitable device. Thus, the handle 302 may be grasped and moved, thereby urging the spread control mechanism 300 to be moved or slid along the path defined by slot 312 so as to move the spread control mechanism 300 between the activated (closed) and deactivated (open) state. The vertically projecting stop mechanism 406 impedes the spread control mechanism 300 from pivoting past the associated exit openings 402 intended for selective closure.

The pivot mechanism 500 is circular and is integrated into the shut-off adjustment plate 400. The curved pivot engagement portion 308 of the spread control mechanism 300 engages the pivot mechanism 500 to facilitate pivoting of the spread control mechanism 300 with respect to the shut-off adjustment plate 400. Thus, in order to pivot the spread control mechanism 300, the user pivots or rotates the user pivots or rotates the spread control mechanism 300 about the pivot mechanism 500 to the desired position.

Although, the spread control assembly illustrated in the figures is configured to disperse material out a particular side of the particulate dispersing apparatus, it is to be understood that in an alternate embodiment, the spread control assembly can be configured to disperse particulate material out an opposite side of the particulate dispersing apparatus.

Figure 26:
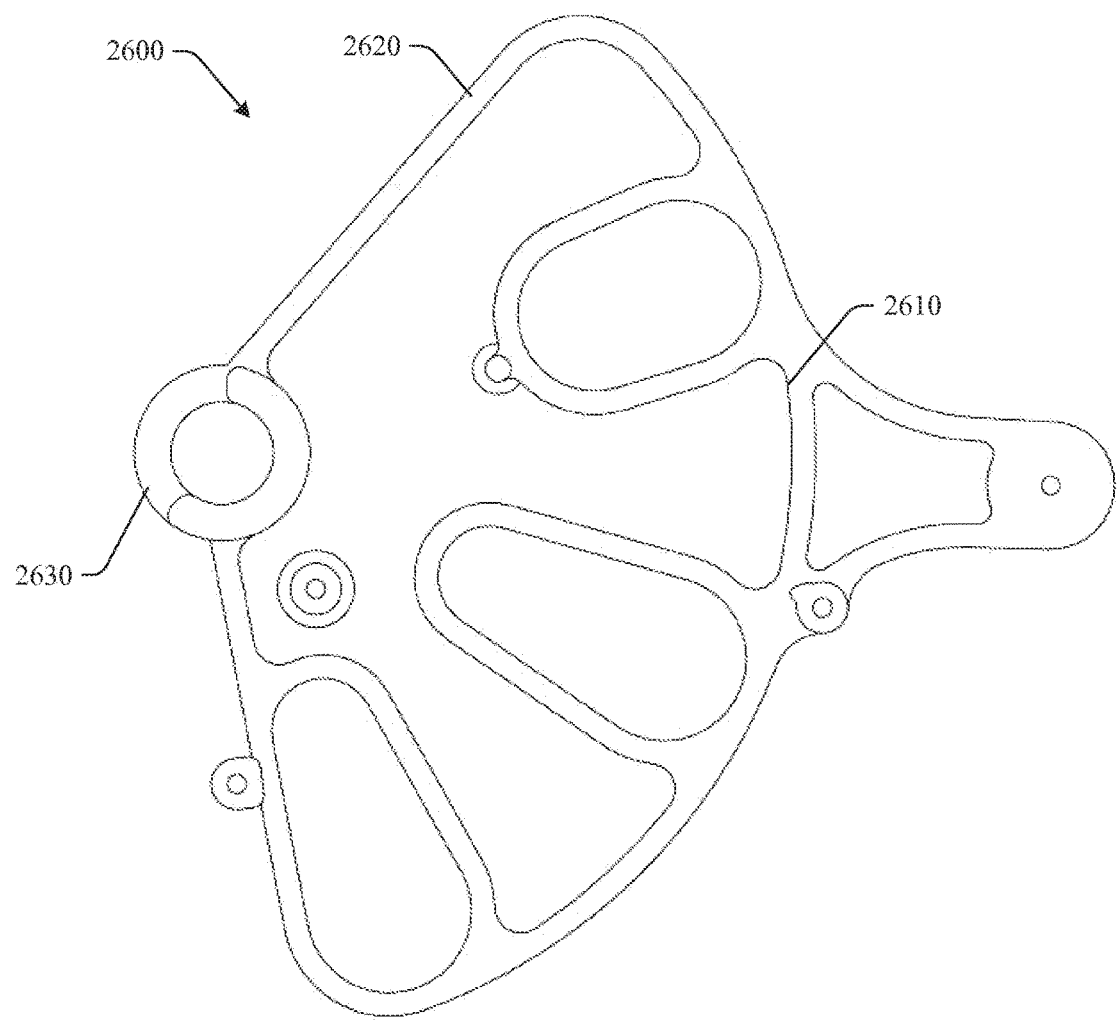
FIG. 26 is another example embodiment of a particulate dispensing apparatus featuring the innovation disclosed herein in accordance with the innovation.

FIG. 26 illustrates an example alternate embodiment of a spread control assembly 2600 similar to the spread control assembly 200 disclosed above in accordance with an aspect of the innovation. The spread control assembly 2600 includes a spread control mechanism 2610, a shut-off adjustment plate 2620, and a pivot mechanism 2630 that pivotally connects the spread control mechanism 2610 and the shut-off adjustment plate 2620. One difference between the spread control assembly 2600 illustrated in FIG. 26 and the spread control assembly 200 illustrated above is that the spread control assembly 2600 does not include the slots 404 defined in the shut-off adjustment plate 400. All other features and functions between the two spread control assemblies 200, 2600 are similar and thus, will not be repeated.

Figure 27:
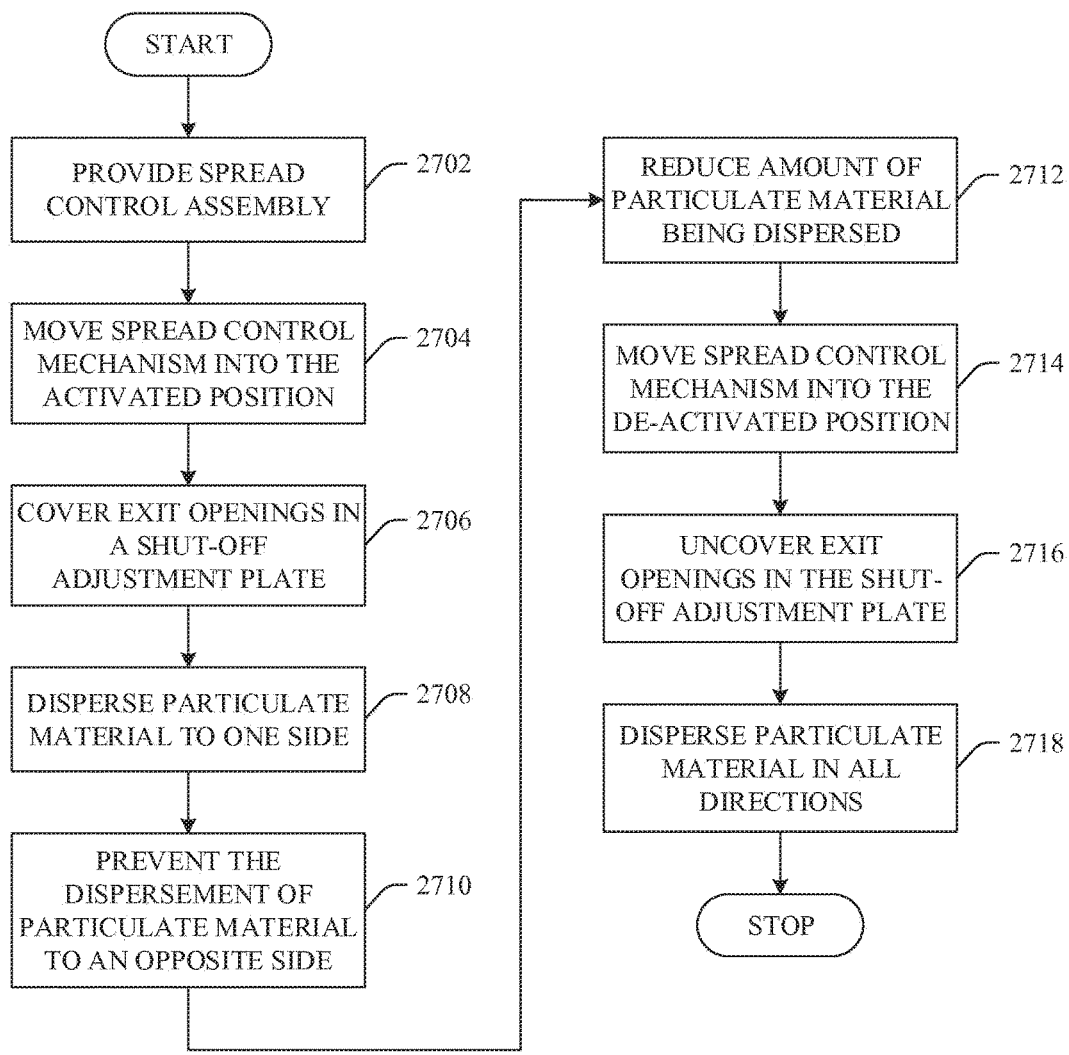
FIG. 27 is a block diagram illustration of a method of dispersing particulate material in accordance with an aspect of the innovation.

Referring to FIG. 27, a process of dispersing particulate material will now be described in relation to the spread control assembly 200 illustrated in FIGS. 2-25 in accordance with one aspect of the innovation. At 2702, a spread control assembly 200 in a non-activated state for a particulate material dispersing apparatus is provided. At 2704, a spread control mechanism 300 is moved via the handle 302 in a direction such that the spread control assembly 200 is in an activated state. At 2706, the paddles 304, 306 cover exit openings 402 defined in the shut-off adjustment plate 400 thereby impeding particulate material from be dispersed through the covered exit openings 402. At 2708, particulate material is dispersed in a direction that corresponds to the side opposite the covered exit openings 402. Simultaneously, at 2710, particulate material is impeded from being dispersed in a direction that corresponds to the side of the covered exit openings 402. Simultaneously at 2712, an amount of dispersed particulate material is reduced thereby minimizing particulate material waste. At 2714, the spread control mechanism 300 is moved in a direction such that the spread control assembly 200 is in a de-activated position. At 2716, the paddles 304, 306 are moved such that the exit openings 402 are uncovered. At 2718, particulate material is dispersed in all directions. The process is repeated as the need arises to impede the dispersing of particulate material in a particular direction so as to impede the dispensing of particulate material on unwanted surfaces, such as driveways, walkways, landscape beds, etc.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A particulate material dispersing apparatus comprising:
   a hopper including a plurality of openings in a bottom of the hopper;
   a shut-off adjustment plate movably coupled to the hopper below the plurality of openings and including a plurality of exit openings, wherein the shut-off adjustment plate is configured to move with respect to the hopper between a fully closed position, in which the shut-off adjustment plate completely covers the plurality of openings in the hopper and obstructs any particulate material from flowing therefrom, to a fully open position, in which the plurality of exit openings align with the plurality of openings in the hopper thus permitting particulate material to flow therefrom; and
   a spread control mechanism disposed below the shut-off adjustment plate and including a plurality of segments, wherein the plurality of segments are configured to move between a deactivated position, in which the plurality of segments do not cover any of the plurality of exit openings in the shut-off adjustment plate thus permitting particulate material to flow therefrom, to an activated position, in which the plurality of segments cover one or more of the plurality of exit openings in the shut-off adjustment plate thus obstructing particulate material from flowing therefrom.

2. The particulate material dispersing apparatus of claim 1, wherein the shut-off adjustment plate abuts a bottom surface of the hopper, and wherein the spread control mechanism abuts the shut-off adjustment plate.

3. The particulate material dispersing apparatus of claim 1, wherein the shut-off adjustment plate is pivotable with respect to the spread control mechanism.

4. The particulate material dispersing apparatus of claim 1, wherein the shut-off adjustment plate has a first exit opening, a second exit opening, and a third exit opening, and wherein the spread control mechanism has a first segment and a second segment.

5. The particulate material dispersing apparatus of claim 4, wherein, when both the first segment and the second segment are in the activated state and the shut-off adjustment plate is in the fully open position, the first segment completely covers the first exit opening, the second segment completely covers the second exit opening, and the third exit opening is not obstructed by the spread control mechanism.

6. The particulate material dispersing apparatus of claim 4, wherein, when both the first segment and the second segment are in the deactivated state and the shut-off adjustment plate is in the fully open position, none of the first exit opening, the second exit opening, and the third exit opening are obstructed by the spread control mechanism.

7. The particulate material dispersing apparatus of claim 1 further comprising a handle coupled to an end of a first segment of the plurality of segments.

8. The particulate material dispersing apparatus of claim 7, wherein the handle is configured to selectively move the first segment between the deactivated position and the activated position.

9. The particulate material dispersing apparatus of claim 8, wherein the handle is further configured to selectively move the second segment between the deactivated position and the activated position.

10. The particulate material dispersing apparatus of claim 1, wherein the spread control mechanism is configured to move with the shut-off adjustment plate when the shut-off adjustment plate moves from the fully closed position to the fully open position.

11. The particulate material dispersing apparatus of claim 1, wherein the spread control mechanism is configured to pivot with respect to the hopper.

12. The particulate material dispersing apparatus of claim 1, wherein the shut-off adjustment plate is configured to pivot with respect to the hopper from the fully closed position to the fully open position.

13. The particulate material dispersing apparatus of claim 12, wherein the spread control mechanism is configured to pivot with the shut-off adjustment plate when the shut-off adjustment plate pivots from the fully closed position to the fully open position.

14. The particulate material dispersing apparatus of claim 1, wherein a number of the plurality of exit openings is one greater than a number of the plurality of segments.

15. The particulate material dispersing apparatus of claim 1, wherein the particulate material dispersing apparatus is a walk behind spreader.

16. The particulate material dispersing apparatus of claim 15, wherein the walk behind spreader includes a push handle and a shut-off assembly coupled to the push handle.

17. The particulate material dispersing apparatus of claim 16, wherein the shut-off adjustment plate is selectively moveable between the fully closed position to the fully open position via the shut-off assembly.

18. The particulate material dispersing apparatus of claim 17 further comprising a handle disposed below the hopper, wherein a first segment of the plurality of segments is selectively movable between the deactivated position and the activated position via the handle.

19. The particulate material dispersing apparatus of claim 1 further comprising a dispersing rotor disposed below the spread control mechanism and configured to disperse particulate material passing through the spread control mechanism.

20. The particulate material dispersing apparatus of claim 1, wherein when the plurality of segments are in the deactivated position, the particulate material dispersing apparatus is configured to spread particulate material in a first pattern about a surface, wherein when the plurality of segments are in the activated position, the particulate material dispersing apparatus is configured to spread particulate material in a second pattern about the surface, and wherein the second pattern is a subset of the first pattern.

21. The particulate material dispersing apparatus of claim 20, wherein the first pattern includes spreading particulate material on both a right side of the particulate material dispersing apparatus and a left side of the particulate material dispersing apparatus, and wherein the second pattern includes spreading particulate material on only one of the right side of the particulate material dispersing apparatus or the left side of the particulate dispersing apparatus.

22. The particulate material dispersing apparatus of claim 1, wherein the plurality of segments includes a first segment and a second segment, and wherein the first segment and the second segment are arranged in a V-shaped configuration.

23. The particulate material dispersing apparatus of claim 1, wherein the shut-off adjustment plate includes a plurality of elongated curved openings configured to pivotably attach the shut-off adjustment plate to the hopper.

24. The particulate material dispersing apparatus of claim 1, wherein the plurality of openings in the hopper includes three openings.

25. The particulate material dispersing apparatus of claim 24, wherein the plurality of exit openings in the shut-off adjustment plate includes three exit openings.

26. The particulate material dispersing apparatus of claim 1, wherein the shut-off adjustment plate includes a pivot mechanism configured to pivotably couple the shut-off adjustment plate to the spread control mechanism.

27. The particulate material dispersing apparatus of claim 26, wherein the spread control mechanism includes a curved pivot engagement portion that pivotably engages the pivot mechanism.

* * * * *